June 24, 1930.  F. T. KERN  1,767,683
HOIST MECHANISM
Filed Jan. 16, 1929  3 Sheets-Sheet 1
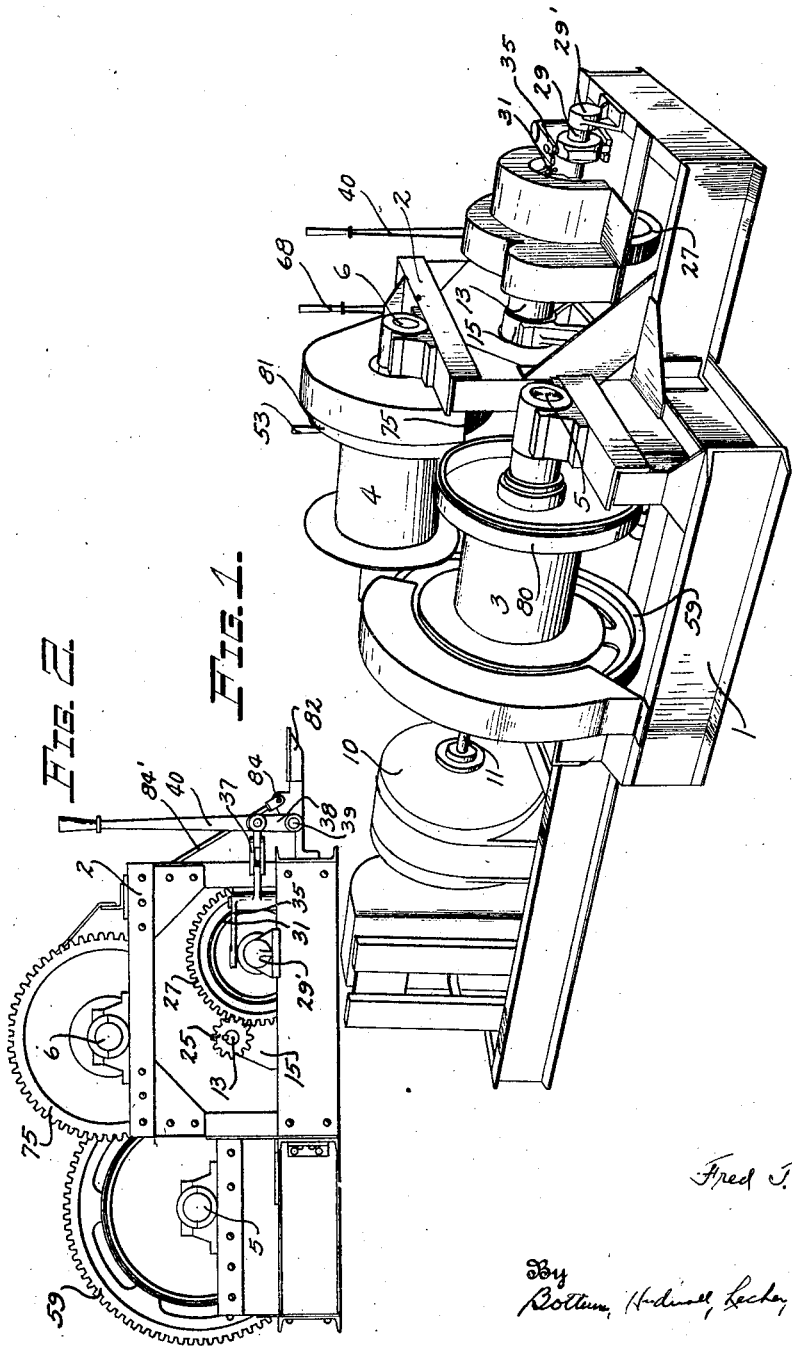
Inventor,
Fred T. Kern June 24, 1930.　　F. T. KERN　　1,767,683

HOIST MECHANISM

Filed Jan. 16, 1929　　3 Sheets-Sheet 2

June 24, 1930.  F. T. KERN  1,767,683
HOIST MECHANISM
Filed Jan. 16, 1929  3 Sheets-Sheet 3
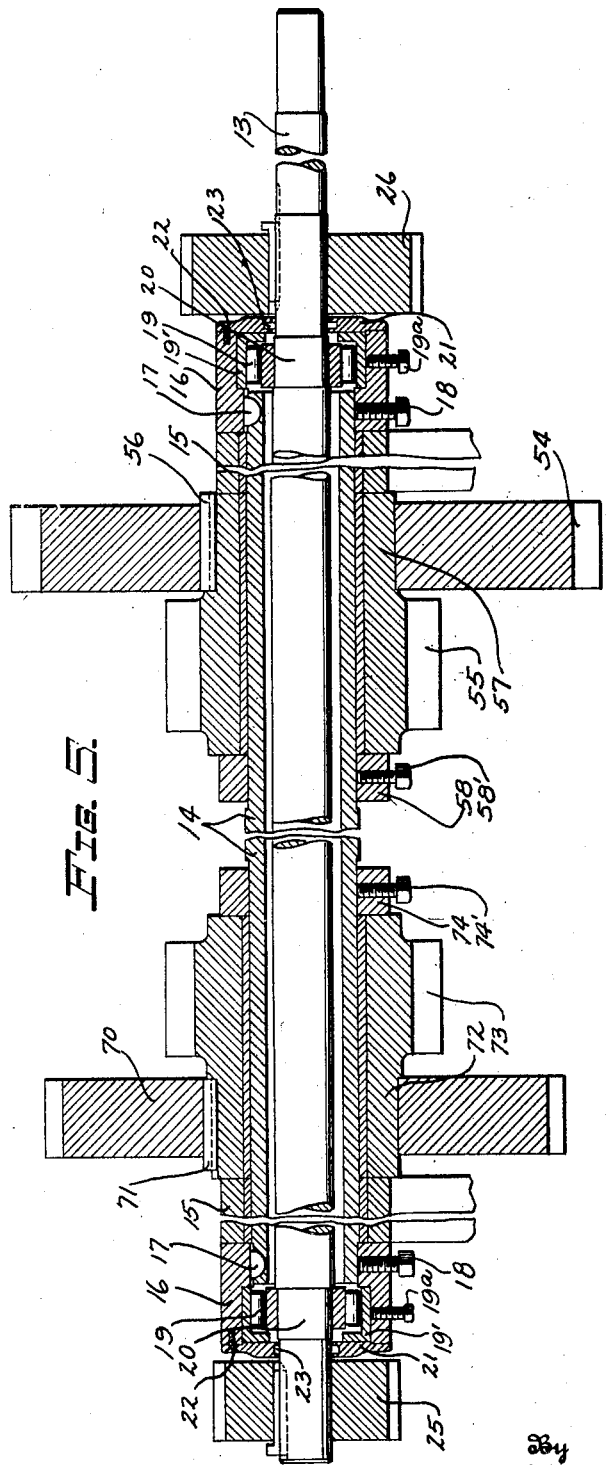
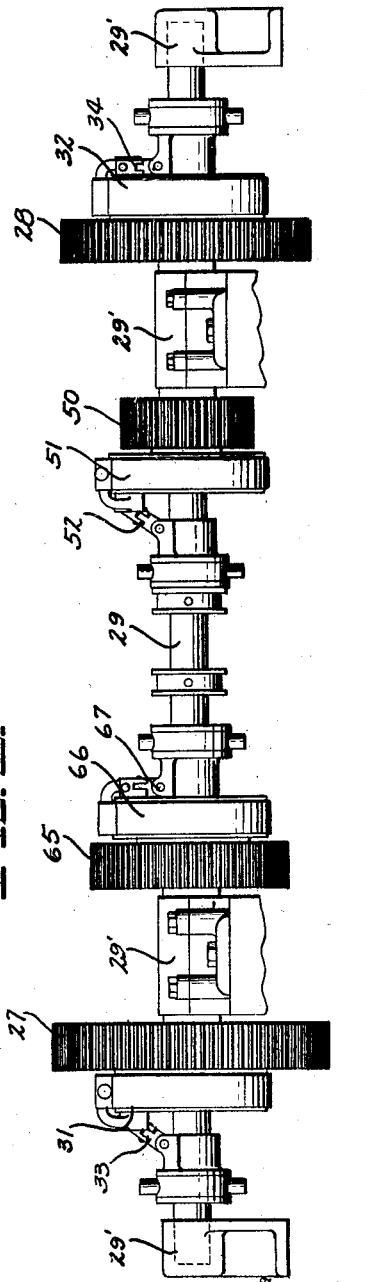
Inventor
Fred T. Kern Patented June 24, 1930

1,767,683

UNITED STATES PATENT OFFICE

FRED T. KERN, OF MILWAUKEE, WISCONSIN

HOIST MECHANISM

Application filed January 16, 1929. Serial No. 332,761.

This invention relates to a hoist mechanism and is especially adapted for use with dragline scrapers although also adapted for other uses. The present invention relates to that type of hoisting mechanism forming the subject matter of my Patent 1,744,970 for hoist mechanism, granted January 28, 1930.

One of the principal objects of the present invention is to provide a hoist mechanism of this type which is of extremely simple and compact construction and which is so organized as to avoid excessive strains upon and crystallization and breakage of the drum shafts or other parts of the mechanism and which realizes these advantages while maintaining an ease of control and a flexibility of operation.

In carrying out the present invention a pair of drums are provided and are fixed to drum shafts rotatably supported in bearings provided therefor on side frames supported upon and secured to a suitable base. The base and side frame constitute the general fixed frame structure of the machine. The drums are spaced vertically and horizontally and in between the drums a motor driven drive shaft extends, the drive shaft being disposed parallel to the drum axes. An intermediate portion of the drive shaft extends through a fixed hollow shaft or sleeve shaft which is supported and held in brackets carried by the base. Roller bearings are provided for supporting the drive shaft on the fixed sleeve shaft. On the portions of the drive shaft lying outside of and adjacent the ends of the fixed sleeve shaft drive pinions are keyed and constantly mesh with driven gear wheels loosely mounted on a countershaft paralleling the drive shaft and rotatably supported in bearings provided therefor on the base. The drive pinions are of different diameters and the driven gear wheels meshing with the drive pinions are also of different diameters so that the two sets of pinions and gear wheels provide change speed gear mechanism. A clutch is provided between each driven gear wheel and the countershaft whereby the driven gear wheels may be selectively fixed to the countershaft to rotate the same at the desired speed. The operating mechanisms for the clutches are controlled from a single control lever which is so linked or connected to these operating mechanisms as to throw out both clutches in the neutral position of the lever, throw in one clutch and throw out the other in another position of the lever and reversely operate the clutches in a third position of the lever. Drum selection reduction gearing is provided between the countershaft and the drum shafts, and consists broadly of two trains of gears, one for each drum, each train of gears having a driving gear wheel loosely mounted on the countershaft and clutched thereto when desired, the driving gear wheel meshing with one of a pair of intermediate gears which are fixed to rotate together and are loosely supported for rotation on the fixed sleeve shaft. The other intermediate gear meshes with a large gear wheel fixed to the associated drum shaft. Individual control levers are provided for the clutches which regulate the drive of the drum selection gear trains from the countershaft. All of the control levers are supported on a common control shaft. The control shaft also supports foot pedals which control the application of brakes to the drums.

The principal feature of the present hoist mechanism resides in the organization with the fixed sleeve shaft of the motor drive shaft and of the intermediate gears of the drum selection gearing. This construction compacts and consolidates the mechanism and along with the feature of having all of the clutches mounted on the countershaft avoids placing any strains on the drum shafts or associated parts and precludes crystallization and breakage.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a prespective view showing a hoist mechanism embodying the present invention;

Figure 2 is a view thereof in side elevation, parts being broken away and shown in section for the sake of simplicity in illustration;

Figure 3 is a diagrammatic plan view illustrating the construction and relations of the various elements of the mechanism but showing the drive shaft and sleeve shaft and parts associated therewith displaced rearwardly for the purpose of more clearly illustrating the mechanism;

Figure 4 is a detail view partly in elevation and partly in section illustrating the drum brakes and the operating mechanism therefor;

Figure 5 is a view taken in section on line 5—5 of Figure 3, parts being shown in elevation for the sake of simplicity in illustration; and Figure 6 is a detail view in elevation showing the countershaft and the clutches and gears mounted thereon.

Referring to the drawings, the numeral 1 designates the base on which parallel side frames 2 are supported and securely fastened. A pair of drums is provided and includes an inhaul drum 3 and a retrieve drum 4 fixed to drum shafts 5 and 6, respectively, the drum shafts 5 and 6 being rotatably supported in bearings provided therefor on the side frames.

As pointed out above, the present invention proposes broadly a novel motor driven mechanism for selectively driving the drums 3 or 4 at different speed and power ratios.

In carrying out this purpose an electric motor 10 or any other suitable form of motor such as an internal combustion engine is supported upon the base 1 and has its shaft 11 coupled as at 12 to a drive shaft 13. The drive shaft 13 extends parallel to the drum shafts 5 and 6 and below the drum 3. The drums 3 and 4, as shown in the drawings, are spaced vertically and horizontally. The correct location of the shaft 13 will be understood from Figures 1 and 2 rather than from Figure 3 as the latter view is diagrammatic. As shown in Figure 5, an intermediate portion of the drive shaft 13 extends through a fixed hollow shaft or sleeve shaft 14 which is supported and clamped or otherwise suitably held in bearing brackets 15 carried by the base 1. The ends of the sleeve shaft 14 project beyond its bearing brackets 15 and have caps 16 supported thereon and secured thereto by means of keys 17 and set screws 18. Roller bearing assemblies 19 are mounted in the caps 16 and coact with journals 20 formed on the shaft 13 to rotatably support the drive shaft on the fixed sleeve shaft. The roller bearing assemblies 19 are of conventional construction and having their outer race members 19' held against movement in any suitable way, as, for example, by set screws 19ª. The caps 16 have removable end plates 21 detachably secured by screws 22 to the body of the caps. The end plates 21 are centrally apertured to accommodate the drive shaft and the walls of these central apertures are grooved to receive felt washers 23 which engage the shaft 13 and exclude dust and dirt from the bearings 19.

The portions of the drive shaft 13 which project beyond the ends of the caps 16 have drive pinions 25 and 26 keyed thereto and constantly meshing with drive gears 27 and 28, respectively. The driven gears are loosely mounted on a countershaft 29 rotatably supported in bearings 29' provided therefor on the base of the machine. As illustrated to advantage in Figure 3, the pinions 25 and 26 are of different diameter and the gear wheels 27 and 28 may also be of different diameters so that the pinions 25 and 26 and their coacting gear wheels 27 and 28 provide change speed gear mechanism operable to drive the countershaft 29 at different speed and power ratios. The gear wheels 27 and 28 are loose on the countershaft 29 but are selectively clutched or fixed thereto by means of clutches 31 and 32, respectively. These clutches are of conventional construction and are thrown in and out by conventional operating mechanism designated at 33 and 34, the operating mechanism for the respective clutches being controlled from shifters 35 and 36, linked as at 37 to crank arms 38 fixed to a control shaft 39 which is turned by means of a single control lever 40. It will be noted from Figure 3 that the clutch 31 and its operating and shifting mechanism is located on the opposite side of the gear wheel 27 from that on which the clutch 32 and its operating and shifting mechanism are located. Thus, when the shaft 39 is rotated in one direction it will engage the clutch 31 and disengage the clutch 32 and when it is moved in an opposite direction it will reversely actuate these clutches. In the neutral position of the control lever 40 clutches 31 and 32 are both disengaged.

The drum selection reduction gearing between the countershaft and the drums includes a clutch controlled reduction gear train between the countershaft and each drum shaft. Thus, the drum 3 may be driven from the countershaft 29 through a gear train including a driving gear 50 loosely mounted on the countershaft 29 but fixed or clutched thereto when desired by means of a clutch 51 of conventional construction and having conventional operating mechanism 52 controlled from a control lever 53 loosely mounted on the control shaft 39. The driving gear meshes with a gear wheel 54 constituting one member of a pair of intermediate gear wheels, the other member of which pair is designated at 55. As shown in Figure 5, the gear wheel 54 is keyed as at 56 to the elongated hub 57 of the gear wheel 55, and the gear wheel 55 is rotatably mounted on the fixed sleeve shaft 14. Thus, the gear wheels 54 and 55 rotate together or as a unit on the fixed sleeve shaft 14. One end of the hub of the gear wheel 55 engages the adjacent bearing bracket 15 and the other end engages a collar 58 fixed by a set screw 58' to the hollow sleeve shaft 14 whereby the intermediate gears are prevented from shifting axially although they are freely rotatable. The intermediate gear wheel 55 meshes with a large driven gear wheel 59 fixed to the drum shaft 5.

For the purpose of driving the retrieve drum 4 from the countershaft when desired a driving gear 65 is loosely mounted on the countershaft and is clutched thereto by means of a conventional clutch 66 having conventional operating mechanism 67 controlled from a control lever 68 rotatably mounted on the control shaft 39. The driving gear wheel 65 meshes with an intermediate gear wheel 70 keyed as at 71 to the elongated hub 72 of a second intermediate gear wheel 73 rotatably mounted on the fixed sleeve shaft 13 and confined against axial shifting by virtue of the engagement of one end of its hub 72 with the adjacent bracket 15 and the engagement of the other end of its hub with a collar 74 fixed by a set screw 74' to the fixed sleeve shaft. The intermediate gear wheel 73 meshes with a large gear wheel 75 fixed to the drum shaft 6.

From Figure 3 it will be understood that the ratio of the gear wheel making up the two gear trains constituting the drum selection gearing is such as to provide for the desired reduction.

The drums 3 and 4 have flanged ends with which brake bands designated at 80 and 81 coact. The bands 80 and 81 each have one end anchored on the frame and have their other ends controlled from foot pedals 82 and 83 loosely mounted on the control shaft 39 in between the levers 53 and 68 which control the selection of the drums.

Thus, as shown in Figures 3 and 4, the foot pedal 82 is pivotally connected as at 84 to one end of a connecting rod 84', the other end of which is pivotally connected as at 85' to a crank arm 85 fixed to a shaft 86 rotatably mounted in suitable bearings and having a second crank arm 87 connected by a link 88 to one end of the band. In other words, suitable motion transmission means is provided between the foot pedal 82 and the end of the band 81 that is to be tightened and loosened to control the drum 4. Similarly suitable motion transmission means is provided between the foot pedal 83 and the end of the band 80 and, as shown, comprises a connecting rod 89 having one end pivoted to a projection of the foot pedal 83 and having its other end connected to a crank arm 90 fixed on a shaft 91 which has a second crank arm 92 connected by a link 93 to the free end of the band 80.

The gearing for actuating the drums is preferably enclosed as shown in Figure 1.

In operation the control levers 68 and 53 are manipulated to select the drum 3 or 4 that is to be driven and the control lever 40 is manipulated to drive the selected drum at high or low speed, as may be desirable under the conditions encountered. When a drum has been selected the speed may be changed instantly by a single motion of the lever 40. Whenever desired the brakes may be applied to the drums by depressing the foot pedals 82 and 83 or either of them. The controls are thus so consolidated as to enable a single operator to easily and efficiently control the operation of the machine.

As pointed out, the single fixed sleeve shaft 14 provides a common support for the drive shaft and for the intermediate gears of the two gear trains which constitute the drum selection gearing. This feature not only compacts and consolidates the mechanism but has been found to provide a very durable and satisfactory construction. For a long time with hoists of this kind, a serious difficulty has arisen in connection with the drum shafts and the drive shaft which, despite the various precautions that have been taken, have become crystalized and broken after a short life. With applicant's novel mode of supporting the drive shaft and the intermediate gears of the drum selection gearing the shafting is relieved of excessive strains and as a consequence crystalization and breakage of the shafting is avoided.

While the drum selection reduction gearing has been described as driving the drum shafts to which the drums are fixed it is to be understood that with the present invention this drum selection reduction gearing may drive the drums directly, the drums in such event being loosely or rotatably mounted on the drum shafts and the drum shafts being fixed or clamped in suitable bearings or supports. As far as the present invention is concerned it is immaterial whether the drums are directly driven from the reduction gearing or are driven through the drum shaft. However, if the drums are directly driven then the gear wheels 59 and 75 are connected to their respective drums so as to constrain the drums to rotate therewith.

The invention claimed is:

1. In a mechanism of the character described, a pair of drums, and means for selectively driving the drums at variable speed and power ratios and comprising a motor driven drive shaft, a fixed sleeve shaft in which the drive shaft is rotatably supported, a countershaft, change speed gearing for driving the countershaft, and drum selection gearing for driving the drums from the countershaft and including gear wheels rotatably mounted on the fixed sleeve shaft.

2. In mechanism of the character described, a pair of drums and means for selectively driving the drums at different speed and power ratios and including a motor driven drive shaft, a fixed hollow shaft receiving and rotatably supporting an intermediate shaft, a countershaft, change speed gearing between the drive shaft and the countershaft including pinions fixed to the drive shaft, gear wheels meshed with the pinions and loosely mounted on the countershaft and clutches for selectively fixing the gear wheels to the countershaft, a gear train between the countershaft and each drum, each gear train including a driving gear loosely mounted on the countershaft, a clutch between each driving gear and the countershaft, a pair of intermediate gear wheels rotatably mounted on the fixed shaft and actuated from the driving gear, and a gear wheel fixed to rotate with the drum and actuated from the intermediate gears.

3. In mechanism of the character described, a pair of drums, a drive shaft, a sleeve shaft through which the drive shaft extends, means for fixedly supporting the sleeve shaft, bearings carried by the sleeve shaft and engaged with the drive shaft, and gearing for selectively driving the drums from the drive shaft at variable speed and power ratios and including gear wheels rotatably mounted on the sleeve shaft but fixed against longitudinal movement thereon.

4. In mechanism of the character described, a frame structure, a pair of drums rotatably mounted thereon, a drive shaft, a sleeve shaft receiving an intermediate portion of the drive shaft, means on the frame structure for supporting and holding the sleeve shaft adjacent its ends, caps fixed to the ends of the sleeve shaft and carrying bearings for the drive shaft, gearing for selectively driving the drums from portions of the drive shaft exterior of the sleeve shaft at variable speed and power ratios, and including gear wheels rotatably mounted on the fixed sleeve shaft, and means on the fixed sleeve shaft for preventing axial shifting of said gear wheels while permitting free rotation thereof.

5. In mechanism of the character described, a frame structure, a pair of drums rotatably mounted thereon, a drive shaft, a sleeve shaft receiving an intermedate portion of the drive shaft, means on the frame structure for supporting and holding the sleeve shaft adjacent its ends, caps fixed to the ends of the sleeve shaft and carrying bearings for the drive shaft, a countershaft, pinions fixed to the drive shaft adjacent said caps, gear wheels loosely mounted on the countershaft and meshed with the pinions, clutches between said gear wheels and the countershaft, and a clutch controlled gear train between the countershaft and each drum, each gear train including a pair of intermediate gears loosely mounted on the fixed sleeve shaft and connected to rotate as a unit.

6. A hoisting mechanism of the type having a pair of drums and means for selectively driving the drums at variable speed and power ratios including a motor driven drive shaft, a countershaft, clutch controlled change speed gearing between the drive shaft and the countershaft and a clutch controlled gear train between the countershaft and each drum, said clutches all being mounted on the countershaft, and further characterized by the provision of a fixed hollow shaft which rotatably supports the drive shaft and elements of the gear trains.

In witness whereof, I hereto affix my signature.

FRED T. KERN.